Aug. 5, 1952  H. W. THYLEFORS  2,605,623
SHEAR PIN COUPLING
Filed July 10, 1946
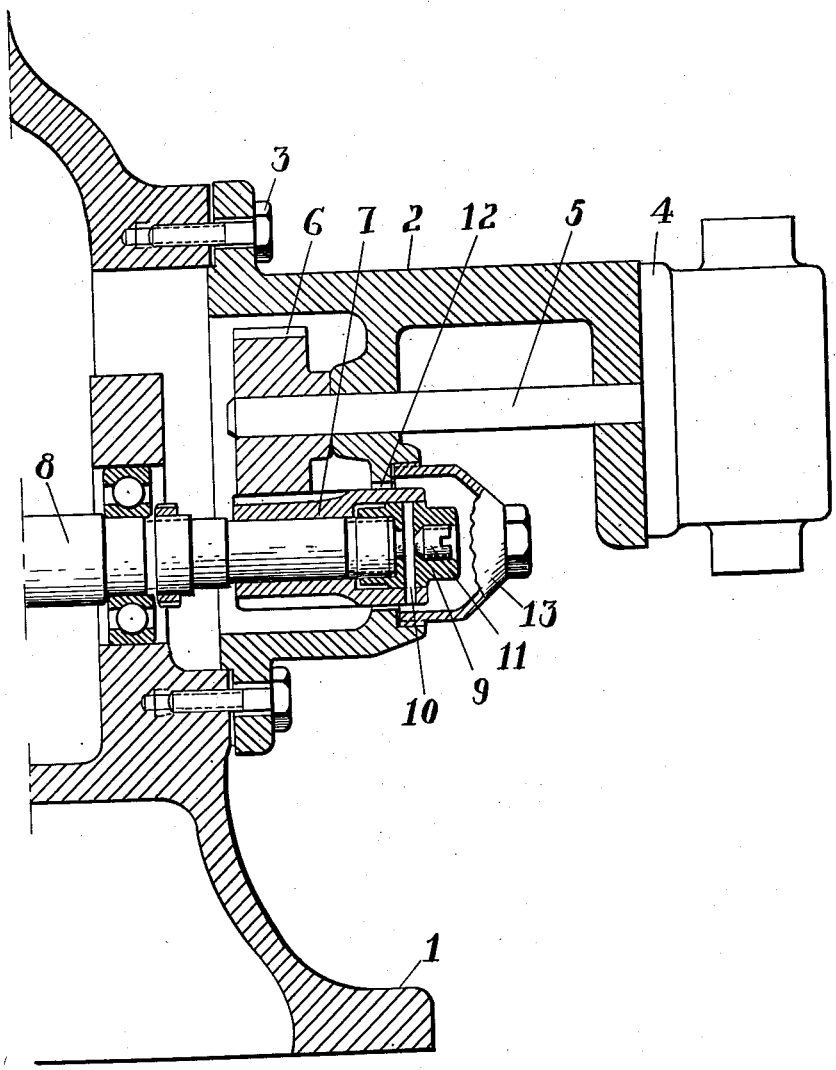
INVENTOR.
Henric Wilhelm Thylefors
BY
Busser and Harding
ATTORNEYS Patented Aug. 5, 1952

2,605,623

UNITED STATES PATENT OFFICE 2,605,623

SHEAR PIN COUPLING

Henric Wilhelm Thylefors, Stockholm, Sweden, assignor to Aktiebolaget Separator, Stockholm, Sweden, a corporation of Sweden Application July 10, 1946, Serial No. 682,630
In Great Britain August 28, 1945

6 Claims. (Cl. 64—28)

With centrifugal separators the liquid to be separated is often fed to the bowl by means of a pump in the feed pipe, and also the separated liquid is discharged from the bowl by means of a pump in the discharge pipe or pipes. The pumps are preferably carried out as a separate aggregate which can be attached to the separator, and for this purpose they are generally placed on a bracket or a shelf which is screwed to the frame. The pumps are preferably driven from the worm wheel shaft of the separator. Gear pumps are generally used. The liquid to be separated often contains solid particles, so that it is necessary, especially with the kind of pumps mentioned, to use some arrangement which protects the gear wheels from being damaged by the influence of the solid particles. In the present invention a so-called break-coupling is for this purpose arranged between the worm wheel shaft and the pump or pumps.

In the accompanying drawing, the single illustration is a vertical sectional view of a construction embodying the invention. Referring to the drawing, the structure there shown comprises a separator frame 1 and a bracket 2 fixed to the frame by means of screws 3. The bracket carries one or more pumps 4. Generally there is used one pump in the feed pipe and one in the discharge pipe of the separator. The driving movement is transmitted to the pump shaft 5 by means of two gear wheels 6 and 7. The last mentioned wheel is connected with the worm wheel shaft 8 of the separator by a special coupling, consisting of an intermediate part 9 screwed to the worm wheel shaft, which part is connected with the gear wheel 7 by means of a coupling member 10. The said member 10 consists preferably of a cylindrical pin placed in aligned bores in the part 9 and the wheel 7, as shown in the figure. The pin or coupling 10 is kept in position by means of a screw 11 in the part 9. The part 9, the member 10 and the gear wheel 7 form, as is to be seen from the drawing, when mounted together, a unity rigidly connected to the worm wheel shaft. A part of the bracket has the shape of an open hood turned towards the frame, which hood encloses the gear wheels. The coupling itself protrudes through a hole 12 in the hood and is in the main placed outside the hood and protected by a separate hood 13, which is screwed to the bracket. After removing the hood 13 the unity consisting of the part 9, the member 10 and the gear wheel 7 becomes accessible from the outside and can be detached without any other machine parts having to be displaced.

As is said above, the driving movement is transmitted from the worm wheel shaft 8 to the gear wheel 7 by means of the coupling member 10. At too high a load, due for instance to solid particles in the liquid to be separated, the coupling member is broken, thus breaking the rigid connection between the worm wheel shaft 8 and the wheel 7. Damaging of the pump or pumps is hereby avoided. With a view to this such a dimension is given to the member 10 that only a certain maximum driving moment can be transmitted.

If the coupling member has broken one need only remove the hood 13, screw off the part 9 from the worm wheel shaft and remove the part 9 and the gear wheel 7. Then these details can in a suitable place be mounted together by means of a new coupling member, and as a whole again be placed in the machine. After the mounting of the hood 13 the separator is again ready to be used. It is of importance that the replacing of the broken member by a new one can be carried out in a suitable place and that the wheel 7 and the part 9 can as a whole again be put in their place in the separator, the mounting work on the separator itself thereby becoming the least possible. This is of advantage with regard thereto that the separators are often erected in very restricted spaces and therefore more or less difficult to get at.

By placing the break-coupling between the worm wheel shaft 8 and the gear wheel 7 the advantage is obtained that if several pumps are simultaneously driven the functioning of all of them ceases at the breaking of the coupling member. The arrangement according to the drawing has also the advantage that the pieces of a broken member 10 cannot fall down into the interior of the separator frame, the play between the hole 12 and the wheel 7 being so small that this is prevented. The said pieces are instead kept within the hood 13, and there is no danger that same could damage the parts enclosed in the frame.

Other embodiments are possible. Thus the part 9 could be dispensed with if for instance the end of the worm wheel shaft is provided with an open slot in which the coupling member 10 directly engages at the mounting of the parts on the worm wheel shaft.

I claim:

1. In a machine having a shaft provided with a free end, a rotatable device, and a driving connection between the shaft and device including a driving element rotatably mounted on the shaft and slidable off the free end thereof, the improvement which comprises a coupling including a releasable torque-transmitting part rotatably mounted on the shaft and movable off said end thereof with the driving element, the driving element having a portion surrounding said part and extending axially away from the shaft beyond said end thereof, said part and the surrounding portion of the driving element having aligned openings extending transversely of the shaft, a breakable coupling member extending transversely of the shaft through said aligned transverse openings in the driving element and releasable part, the coupling member being rotatable with said part and element relative to the shaft, and a threaded driving connection between the releasable part and the drive shaft to permit release of said part by rotation thereof relative to the shaft, whereby said coupling member, releasable part and driving element are held in driving relation on the shaft by said threaded connection but are rotatable as a unit to remove them from the shaft.

2. The improvement as defined in claim 1, in which said machine has a frame provided with an opening leading to the exterior of the frame, said coupling projecting outwardly at least partly through said opening whereby the coupling is accessible from outside the frame.

3. The improvement as defined in claim 1, in which said machine has a frame provided with an opening leading to the exterior of the frame, said coupling projecting outwardly at least partly through said opening whereby the coupling is accessible from outside the frame, and a removable hood mounted on the outside of the frame to receive the outwardly projecting part of the coupling, including said coupling member.

4. The improvement as defined in claim 1, comprising also a releasable device mounted on said torque-transmitting part and clamping said coupling member in its driving position in said openings.

5. In a machine having a shaft and a device to be driven from the shaft, a driving connection between the shaft and device, which comprises a driving element having a loose fit on the shaft, a torque-transmitting member removably threaded on the shaft and disposed at least partly within the driving element, said member having a part opposing one end of the shaft and provided with an opening extending transversely of but beyond said end of the shaft, the driving element having an opening aligned with said first opening, and a shear pin disposed in the opening in said member and projecting into said aligned opening in the driving element, whereby said element, member and pin are removable as a unit from said end of the shaft.

6. A driving connection according to claim 5, comprising also a set screw extending axially of the shaft in said opposing part of the torque-transmitting member, the set screw engaging the pin to hold it in position.

HENRIC WILHELM THYLEFORS.

REFERENCES CITED

The following references are of record in the file of this patent:

UNITED STATES PATENTS

| Number | Name | Date |
|---|---|---|
| 718,461 | Hult et al. | Jan. 13, 1903 |
| 1,006,768 | McMullen | Oct. 24, 1911 |
| 1,383,854 | Rathbun | July 5, 1921 |
| 1,493,188 | Campbell | May 6, 1924 |
| 1,510,657 | Coleman | Oct. 7, 1924 |
| 1,758,180 | Stein | May 13, 1930 |
| 1,805,879 | McKenny | May 19, 1931 |
| 1,849,174 | Carter | Mar. 15, 1932 |
| 2,094,682 | Shaffer | Oct. 5, 1937 |
| 2,144,269 | Peltz | Jan. 17, 1939 |
| 2,298,316 | Simmons | Oct. 13, 1942 |

FOREIGN PATENTS

| Number | Country | Date |
|---|---|---|
| 112,372 | England | Jan. 10, 1918 |
| 195,524 | England | 1923 |